Aug. 19, 1941.　　　C. A. PALMGREN　　　2,253,345
CHUCK
Filed Aug. 12, 1939　　　2 Sheets-Sheet 1
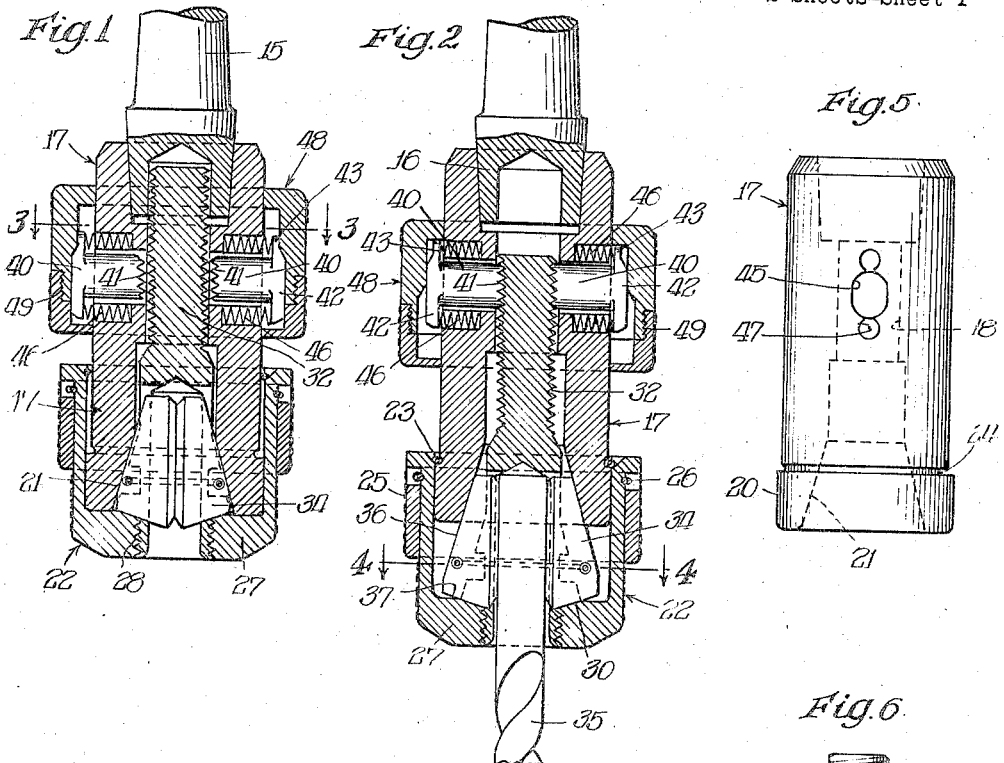
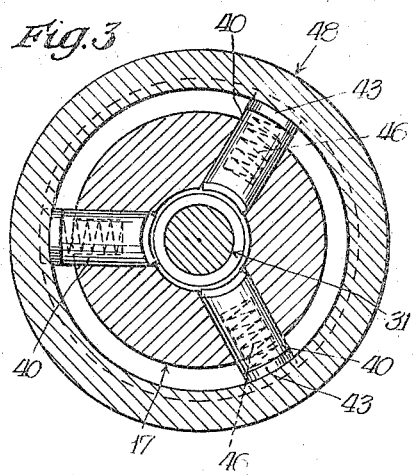
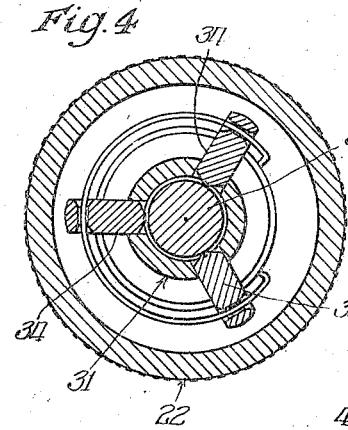
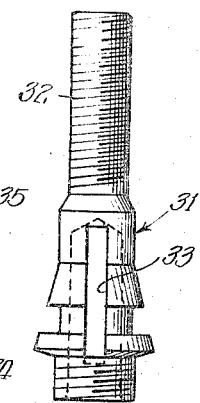
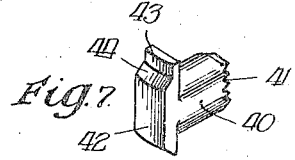
Inventor
Carl A. Palmgren
By Wilkinson Huxley
Byron & Knight Attys Aug. 19, 1941.  C. A. PALMGREN  2,253,345
CHUCK
Filed Aug. 12, 1939  2 Sheets-Sheet 2
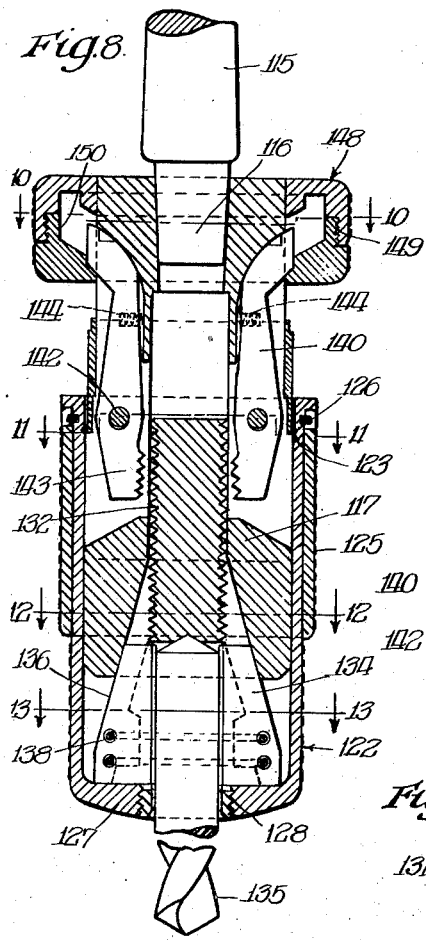
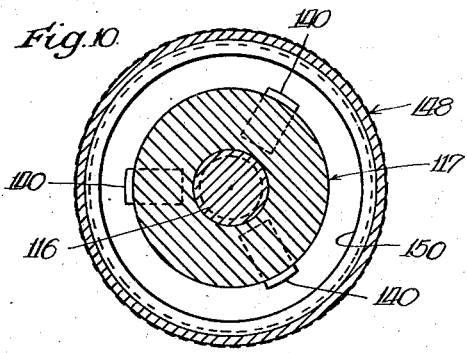
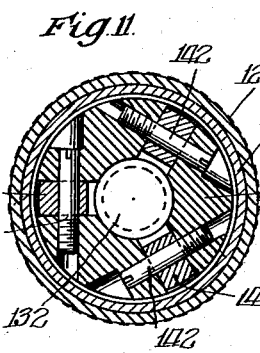
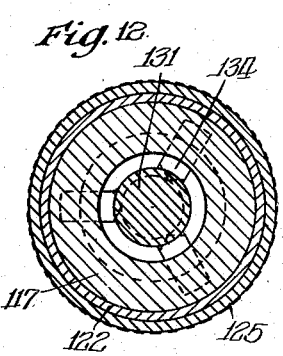
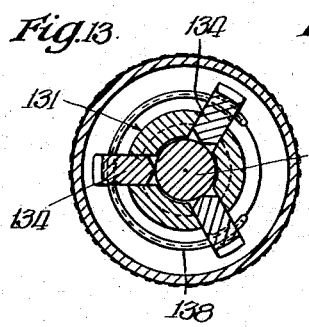
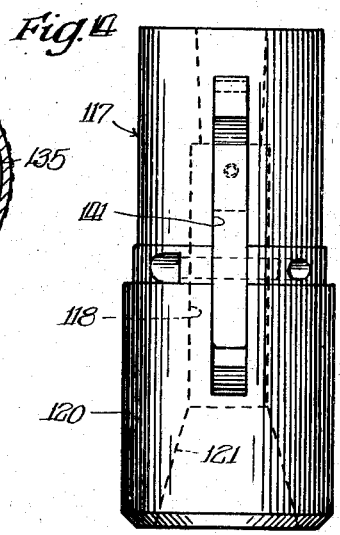
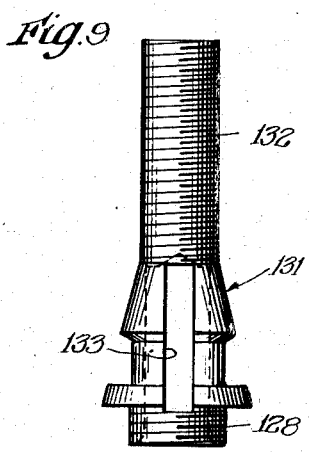
Inventor
Carl A. Palmgren
By Wilkinson, Huxley,
Byron & Knight Attys.

Patented Aug. 19, 1941

2,253,345

UNITED STATES PATENT OFFICE 2,253,345

CHUCK

Carl A. Palmgren, Chicago, Ill.

Application August 12, 1939, Serial No. 289,770

6 Claims. (Cl. 279—60)

The invention relates to improvements in chucks for securely gripping and holding in operative position boring tools and the like and has for its principal object the provision of a new and improved automatic chuck whereby the insertion of a tool will require the minimum in time and labor and whereby the tool can be released with equal facility.

Another object of the invention resides in a chuck of novel construction which will permit release of the tool held thereby while the shank of the chuck continues its rotation and which release may be effected by the operator easily and without danger and with the minimum of time and effort.

Another object is to provide a chuck which will be automatic in the sense that actuation of a member on the exterior of the chuck will cause release of the tool from the same and whereby return of said movable member to initial position will effect a grip on said tool or on a new tool that has been inserted in the chuck.

Another object of the invention is to provide an automatic chuck as described whereby actuation of said exterior member to release the tool or effect a grip on a new tool will not require stopping of the machine providing power for rotating the chuck and whereby the new tool may be inserted without danger to the operator since the gripping jaws can be held against rotation.

Another object has reference to a chuck which will grip and hold the tool with an intensity that increases in direct proportion to the increase in pressure applied to the tool during the boring and other operations.

Another object is the provision of an automatic chuck wherein the movable member on the exterior thereof for releasing the gripping jaws or for setting the jaws so that they grip a tool will require actuation in an upward direction and which is against gravity so that it is therefore impossible to inadvertently actuate said movable member.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is a vertical sectional view of the present chuck with shank attached, showing the internal construction of the chuck with the parts in one position of operation;

Figure 2 is a vertical sectional view similar to Figure 1 but showing the internal parts of the chuck in their other position of operation;

Figure 3 is a horizontal sectional view taken substantially along line 3—3 of Figure 1;

Figure 4 is a horizontal sectional view taken substantially along line 4—4 of Figure 1;

Figure 5 is a view in elevation of the adapter of the present chuck;

Figure 6 is an elevational view of the retainer of the chuck showing the threaded upper end and the slots in the base portion thereof for holding the gripping jaws;

Figure 7 is a perspective view showing one of the slidable release studs;

Figure 8 is a vertical sectional view showing a modified form of automatic chuck embodying the features of the invention;

Figure 9 is a view in elevation of the retaining member for the form of chuck shown in Figure 8;

Figure 10 is a transverse sectional view taken on line 10—10 of Figure 8;

Figure 11 is a transverse sectional view taken substantially along line 11—11 of Figure 8 and showing the pivoting means for the release fingers;

Figure 12 is a horizontal sectional view taken substantially along line 12—12 of Figure 8;

Figure 13 is a horizontal sectional view taken substantially along line 13—13 of Figure 8; and Figure 14 is an elevational view showing the adapter of the chuck of Figure 8.

Referring to the drawings, particularly Figures 1 and 2, the chuck of the invention in its preferred form is shown in association with a shank 15 having a portion 16 formed on its lower end which tapers reversely to the general taper of the shank. The shank is adapted to be inserted within a holder forming part of the drill press or other machine, not shown, and which supplies power for rotating the chuck, the same being transmitted thereto through the shank 15. The tapered lower end 16 is non-rotatably secured to an adapter or body member indicated in its entirety by numeral 17, Figure 5, which is of generally cylindrical shape having the vertical passage 18 of variable diameter extending centrally through the same. The upper portion of the adapter 17 is secured to the shank as above described. The lower end thereof is somewhat enlarged with respect to its exterior diameter as at 20 and which enlarged end is provided with internal tapering surfaces 21 which form a flaring entrance for the central passage 18 extending vertically of the adapter.

The enlarged portion 20 at the lower end of the adapter receives a sleeve 22 which is rotatably mounted on said lower end and retained in said position by the retaining ring 23 having interfitting relation with the groove 24 formed on the exterior of the adapter immediately above the portion 20 of enlarged diameter. In order that the sleeve may be more easily grasped and held while rotating with the adapter the invention provides an auxiliary sleeve 25 rotatably mounted on the sleeve 20 and releasably held thereto by the retaining ring 26. The said retaining rings may be removed by using a small tool such as a screw driver, but when operatively positioned they allow rotation of the auxiliary sleeve 25 on the main sleeve 22 and rotation of said main sleeve with respect to the adapter 17. It will also be observed that the sleeve 22 may have slidable movement on the adapter in a substantially vertical direction, as clearly shown in the drawings, by the changed position of the parts in Figures 1 and 2.

The nose portion 27 of the main sleeve is internally threaded at 28 and tapering surfaces 30 are formed on the interior immediately above the threads. By means of the threads a retaining member indicated in its entirety by numeral 31, Figure 6, is fixedly secured to the main sleeve 22, the same extending within said sleeve and having a threaded upper end 32 located within the passage 18. The retaining member is provided with three slots such as 33 which are disposed lengthwise of the retaining member and spaced from each other approximately 120 degrees. The slots receive the gripping jaws 34. Said jaws may be described as generally triangular in shape, the gripping edge of the jaws forming the hypotenuse or long side of the triangle. The pointed edge of each jaw is directed inwardly, as best shown in Figure 4, so that the same is adapted to engage and clamp the tool 35 inserted within the retaining member for the purpose. The two remaining edges of each jaw, which form the other side of the triangle, slope in opposite directions and as a result of these opposed sloping surfaces each gripping jaw is positively forced in a direction inwardly so that the tool is securely gripped and held by the sleeve 22. The tapering edge 36 of each jaw 34 conforms to the tapering surfaces 21 of the adapter, which slope or taper of the edge 37 conforms to that of the surface 30 with which the said edge engages. Each gripping jaw is provided with an opening approximately centrally thereof through which is inserted the expanding member 38, Figure 4, in the form of a ring of resilient wire which will cause outward movement of the gripping jaws to thereby allow insertion of a tool such as a drill 35. A feature of the present chuck resides in the rotatable mounting of the sleeve 22 on the adapter 17 and in the rotatable mounting of the auxiliary sleeve 25 on the said main sleeve 22. Also it is important that the sleeve 22 have slidable movement on the adapter 17 since the retaining member must move upwardly within the adapter in order to force the gripping jaws into gripping relation with the tool.

The sleeve 22 will have a tendency to assume its lowermost position, as shown in Figure 2, since the weight of the sleeve will move it into this position and this is further accentuated by the resition and this is further accentuated by the retaining member 31 and the gripping jaws 34 retained thereby. Also since the jaws are yieldingly forced into an expanded position this action on the tapering surfaces 21 of the adapter will also result in locating the sleeve in its lowermost position. The upper end of the retaining member is threaded as at 32 and in accordance with the invention releasable means are provided for engaging said threads to thereby cause movement of the retaining member and sleeve in an upward direction with respect to the adapter to produce a closing movement of the gripping jaws and thus a gripping action on a tool or the like inserted within the jaws. The releasable means above referred to in the preferred form of the invention comprises slidable studs 40, Figure 7, each having threads 41 formed on its inner end and having a cap portion 42 of arcuate contour transversely on the exterior surface. The upper end of said cap portion is reduced in thickness as at 43, which reduction takes place gradually as a result of the sloping part 44. Diametrically opposed openings 45 in the adapter each receive a slidable release stud 40 so that the teeth 41 on the inner surface of each stud is positioned for coaction with the threads 32 on the upper portion of the retaining member. The coil springs 46 positioned within recesses 47 yieldingly maintain the studs released with respect to the threads 32 on the retaining member. Such coil springs as shown in Figures 1 and 2 contact the base of their respective recess at one end and engage the inner surface of the cap portion 42 of the studs at their other end.

An actuating ring 48 is mounted on the adapter 17 for actuating the studs so that they can be released with respect to the threads 32 on the retaining member or forced into engagement therewith. Said actuating ring may be formed in two parts, suitably joined by the threads 49 so as to comprise a unit. The interior of the actuating ring is formed to accommodate the cap portions 42 of the studs 40. This will be clearly evident by reference to Figure 1, wherein the ring member 48 has been moved on the adapter 17 into its upper position, in which position of the ring member the large interior diameter within the same is associated with the said cap portion. As a result the slidable studs 40 are allowed to move outwardly, which movement is effected by the coil springs 46 to thereby release the studs from engagement with the threads 32 on the upper end of the retaining member. When the ring member 48 is moved down on the adapter 17 the small diameter on the interior surface of said ring member is caused to contact the cap portions 42 of the studs and move said studs inwardly. In this position the studs engage the threads 32 and accordingly the adapter and retaining member are threadedly connected.

In the modification shown in Figures 8 to 14 inclusive the chuck is associated with a shank 115 of conventional form having a tapering portion 116 on its lower end which is nonrotatably secured to an adapter indicated in its entirely by numeral 117 and shown in elevation in Figure 14. The adapter is generally cylindrical in shape and has a passage 118 therethrough of variable diameter, which passage at the lower end 120 of the adapter is formed with internal tapering surfaces 121 providing a flaring entrance for the said central passage.

The enlarged portion 120, comprising the lower end of the adapter, receives a sleeve 122 which is nonrotatably mounted on said lower end and retained in position by the retaining ring 123 having interfitting relation with a groove formed on the exterior of the adapter immediately above the enlarged portion 120. In order that the sleeve may be easily grasped and held while permitting rotation of the same, the invention provides an auxiliary sleeve 125 rotatably mounted on the sleeve 122 and releasably held thereto by the retaining ring 126. The said retaining rings may be removed by a small tool such as a screw driver or the like, but when operatively positioned they allow rotation of the auxiliary sleeve 125 on the main sleeve and also rotation of said main sleeve with respect to the adapter. It will be observed that the sleeve 122 is not only rotatably mounted on the adapter but that said sleeve also may have slidable movement in a direction longitudinally of the adapter.

The lower end or nose portion 127 of the main sleeve is internally threaded centrally thereof as at 128 for receiving a retaining member indicated in its entirety by numeral 131, Figure 9. By means of the threads the retaining member is fixedly secured to said main sleeve and said member extends within the sleeve having a threaded upper end 132 which is located within the passage 118 of the adapter.

Said retaining member is provided with three slots such as 133 disposed lengthwise thereof and spaced from each other approximately 120 degrees. The slots receive the gripping jaws 134 which are generally quadrilateral in shape, the gripping edge of the jaws comprising the vertical side of the figure. This edge is pointed, as shown by Figure 13, so that the same may engage and clamp the tool 135 inserted within the retaining member for the purpose. The outer tapering edge 136 of each jaw is adapted to engage with the tapering surfaces 121 formed interiorly of the adapter. Each gripping jaw has a pair of openings transverse thereof through which is inserted resilient members 138, Figure 13, in the form of a split ring which causes outward movement or expansion of the gripping jaws to thereby allow insertion of a tool such as a drill 135. The gripping jaws thus normally expand to release the tool and it is necessary in order to grip the tool that the retaining member be forced upwardly within the adapter.

The sleeve 122, by reason of its weight and also since the retaining member is fixed thereto, will normally descend to its lowermost position, as shown in Figure 1. The upper end of the retaining member is threaded as at 132 and the releasable means in this modification, for engaging the threads to thus cause movement of the retaining member upwardly within the adapter includes the pivoted release fingers 140. Said fingers are located within longitudinal slots 141 formed in the adapter and are mounted for pivotal movement by the pins 142. Threads 143 are formed on the inner edge of the lower end of each finger and which are adapted to engage with the threads 132 on the upper end of the retaining member. The resilient coil springs 144 yieldingly force the lower end of said fingers toward the threaded upper end of the retaining member so as to threadedly connect the fingers and thus the adapter with said retaining member.

An actuating ring 148 is slidably mounted on the adapter and has coaction with the upper end of each finger so as to actuate said fingers. The ring may be formed in two parts joined by threads 149 so as to comprise a unit. The interior 150 of the actuating ring is formed to accommodate the upper extremities of the release fingers as will be clearly evident by reference to Figure 1, wherein the ring member has been moved on the adapter 117 into its uppermost position, to effect release of the fingers 140 with the threaded upper end of the retaining member. When the ring member 148 is moved down the upper extremities of the release fingers are received by the interior 150 of said ring member and accordingly, as a result of the coil springs 144 the threads 143 on the lower end of each finger are caused to engage with the threads 132 on the retaining member. In this position of the ring member the adapter and retaining member are threadedly connected.

In operating the chuck of the invention it will be understood that the shank and body member of the chuck continuously rotate during the time the boring operations are being carried out. Assuming that it is desired to release the tool gripped by the chuck so as to insert a new tool the operator need only grip the actuating ring 48 or 148 and move the same upwardly. The ring is rotatable on the adapter and also rotatable with respect to the release studs of Figure 1 or the release fingers as concerns the modification of Figure 8. The slidable movement of the actuating member effects release of the studs or fingers from the threaded end of the retaining member and accordingly the retaining member together with the main sleeve, which is fixed thereto, is free to descend, which movement takes place automatically as a result of the weight of the parts. The gripping jaws automatically expand with this downward movement of the retaining member and the operator is then able to insert the new tool within the jaws.

With the release studs or fingers out of contact with the threaded end of the retaining member the said retaining member and the sleeve fixed thereto may be held against rotation with respect to the adapter and which operation can easily be effected by the operator by merely gripping the said main sleeve and the auxiliary sleeve 25 associated therewith. This operation on the part of the operator holds the main sleeve stationary and accordingly the gripping jaws are held stationary so as to allow the new tool to be inserted without danger. After the tool has been located within the retaining member in associated relation with the gripping jaws the operator holds the tool in place and also holds the main sleeve 22 against rotation. The next operation is to move the actuating ring downwardly to its initial position. In this position of the ring the studs or fingers, as the case may be, are forced into contact with the threaded end of the retaining member and said member together with the gripping jaws and main sleeve are thereby threadedly connected with the adapter.

It will be recalled that the adapter was described as continuously rotating. Since the retaining member and main sleeve are being held by the operator against rotation, it will be seen that relative movement between the parts is taking place, which is in effect screwing the retaining member within the adapter. In other words, the release studs or fingers are rotating with respect to the stationary retaining member. The action results in the retaining member moving upwardly within the adapter and accordingly the gripping jaws are caused to close upon the tool to securely and firmly grip the same. As a result of the gripping of the tool by said jaws it will be seen that the adapter, retaining member and the main sleeve 22 comprise a unit and that the parts must rotate together. For this reason the auxiliary sleeve 25 or 125 is associated with the main sleeve. In other words, said main sleeve rotates with the adapter when a tool is held by the chuck but is rotatable on the adapter following release of the tool.

During the operations of releasing the tool from the chuck, inserting a new tool, and causing the same to be gripped and held by the chuck, the shank and adapter rotate at their usual speed. Very little effort is required to move the actuating ring so as to release the retaining member and thus the tool, and it will be observed that this movement for effecting release is in an upward direction against gravity so that it is practically impossible for the ring member to be inadvertently actuated. Another desirable feature of the present chuck resides in the high degree of safety by which a new tool can be inserted and which does not require stopping of the machine supplying the power for rotating the chuck. The entire operation requires the minimum of time and effort although the drill is securely held by the gripping jaws and which holding force increases in direct proportion to the increase in pressure applied to the tool.

What is claimed is:

1. In a chuck of the character described, a body portion having an axial passage forming an opening in one end thereof, a member having free axial movement on the body portion and also free rotation, said member including a cylindrical part providing a sleeve on the exterior of the body portion and a central projecting part extending within the axial passage in the body portion, gripping jaws positioned by the central projecting part for coaction with tapering surfaces formed by the opening in the body portion, control means on the body portion for operatively connecting said member with the body portion, said control means when operatively positioned having threaded engagement with the central projecting part whereby relative rotation in a certain direction will effect axial movement of the member onto the body portion to cause the gripping jaws to close, and said control means when inoperatively positioned effecting release of the member from the body portion whereby the said member including the cylindrical part and the central projecting part may have free and independent movement on the body portion in an outward direction to cause the gripping jaws to open.

2. In a chuck of the character described, a body portion having an axial passage forming an opening in one end thereof, a member having free axial movement on the body portion and also free rotation, said member including a cylindrical part providing a sleeve on the exterior of the body portion and a central projecting part extending within the axial passage in the body portion, gripping jaws positioned by the central projecting part for coaction with tapering surfaces formed by the opening in the body portion, control means on the body portion for operatively connecting said member with the body portion, said control means when operatively positioned having threaded engagement with the central projecting part whereby relative rotation in a certain direction will effect axial movement of the member onto the body portion to cause the gripping jaws to close, and said control means when inoperatively positioned effecting release of the member from the body portion whereby the said member including the cylindrical part and the central projecting part may have free and independent movement on the body portion in an outward direction to cause the gripping jaws to open, and a stop on the body portion positioned for coaction with the cylindrical part of the member to limit outward movement of said member on the body portion.

3. In a chuck of the character described, a body portion having an axial passage forming an opening at one end thereof, a member having free axial movement on the body portion and also free rotation, said member including a cylindrical part providing a sleeve on the exterior of the body portion and a central projecting part extending within the axial passage in the body portion, gripping jaws positioned by the central projecting part for coaction with tapering surfaces formed by the opening in the body portion, control means including movable members carried by the body portion and adapted to have movement transversely thereof for threadedly connecting the member with the body portion, said control means when operatively positioned having threaded engagement with the central projecting part whereby relative rotation in a certain direction will effect movement of the member onto the body portion to cause the gripping jaws to close, and said control means when inoperatively positioned effecting release of the member from the body portion whereby said member including the cylindrical part and the central projecting part may have free and independent movement on the body portion in an outward direction to cause the gripping jaws to open.

4. In a chuck of the character described, a body portion having an axial passage forming an opening in the lower end thereof, a retaining member extending within said passage and adapted to have free axial movement with respect to said body portion and also free rotation, gripping jaws retained by said member and positioned for coacting relation with tapering surfaces formed by said opening in the body portion, movable means mounted on the body portion for connecting the retaining member with the body portion, said movable means in operative position having threaded engagement with the exterior of the retaining member whereby relative rotation of the parts in a certain direction results in axial movement of the retaining member within the body portion to cause the gripping jaws to close, said movable means in inoperative position releasing the retaining member to permit said member to move outwardly on the body portion to cause the jaws to open, and a sleeve fixedly secured to the retaining member below the gripping jaws and rotatably mounted on the exterior of the body portion, said sleeve providing means to be gripped by the operator so that the retaining member may be rotated or held against rotation while the body portion rotates.

5. In a chuck, a body portion having an axial passage forming an opening in the lower end thereof, a sleeve rotatably mounted on the exterior of the body portion, a retaining member fixedly carried by said sleeve and extending within the axial passage of the body portion, said retaining member for a portion of its length having threads on the exterior thereof, gripping jaws carried by said retaining member at its end adjacent the sleeve and positioned thereby for coacting relation with tapering surfaces formed by said opening in the body portion, whereby movement of the member in an upward direction will contract the jaws so that they will grip and hold a tool and movement of the member in a downward direction will permit the jaws to open, control means carried by the body portion and having an operative and inoperative position with the retaining member, said control means in operative position having engagement with the threaded exterior of the member to connect said member with the body portion so that relative rotation of the parts in a certain direction will cause movement of the retaining member to close the gripping jaws, said control means in inoperative position releasing the retaining member to permit the member to move downwardly on the body portion to cause the gripping jaws to open, and said control means including an actuating ring positioned on the exterior of the body portion for controlling the position of said control means.

6. In a chuck, a body portion having an axial passage forming an opening in the lower end thereof, a sleeve rotatably mounted on the exterior of the body portion, a retaining member fixedly carried by said sleeve and extending within the axial passage of the body portion, said retaining member for a portion of its length having threads on the exterior thereof, gripping jaws carried by said retaining member at its end adjacent the sleeve and positioned thereby for coacting relation with tapering surfaces formed by said opening in the body portion, whereby movement of the member in an upward direction will contract the jaws so that they will grip and hold a tool and movement of the member in a downward direction will permit the jaws to open, control means carried by the body portion and having an operative and inoperative position with the retaining member, said control means in operative position having engagement with the threaded exterior of the member to connect said member with the body portion so that relative rotation of the parts in a certain direction will cause movement of the retaining member to close the gripping jaws, said control means in inoperative position effecting release of the retaining member so that the member will be free to move downwardly on the body portion to cause the gripping jaws to open, and a stop provided by said body portion on the exterior thereof for coaction with said sleeve to limit movement of the sleeve in a downward direction.

CARL A. PALMGREN.